(12) United States Patent
Cultraro

(10) Patent No.: US 8,042,660 B2
(45) Date of Patent: Oct. 25, 2011

(54) DEVICE FOR BRAKING THE MOVEMENT OF A DOOR, DRAWER OR SIMILAR MOVABLE MEMBER

(76) Inventor: Antonino Cultraro, Rivoli (IT)

( * ) Notice: Subject to any disclaimer, the term of this patent is extended or adjusted under 35 U.S.C. 154(b) by 562 days.

(21) Appl. No.: 12/279,812

(22) PCT Filed: Mar. 1, 2007

(86) PCT No.: PCT/IB2007/050670
§ 371 (c)(1),
(2), (4) Date: Aug. 18, 2008

(87) PCT Pub. No.: WO2007/099508
PCT Pub. Date: Sep. 7, 2007

(65) Prior Publication Data
US 2009/0064455 A1 Mar. 12, 2009

(30) Foreign Application Priority Data
Mar. 3, 2006 (IT) .......................... TO2006U0031 U

(51) Int. Cl.
*F16D 57/02* (2006.01)
(52) U.S. Cl. ........................ 188/293; 188/290; 188/83
(58) Field of Classification Search .................. 188/82.1, 188/83, 290, 291, 293; 16/51
See application file for complete search history.

(56) References Cited

U.S. PATENT DOCUMENTS

| 4,527,675 | A | | 7/1985 | Omata et al. |
| 4,638,528 | A | * | 1/1987 | Omata .............................. 16/51 |
| 4,830,151 | A | | 5/1989 | Numata |
| 5,449,054 | A | * | 9/1995 | Wiese et al. .................. 188/293 |
| 2005/0045439 | A1 | * | 3/2005 | Nishiyama .................... 188/290 |

FOREIGN PATENT DOCUMENTS

| DE | 89 10 118 U1 | 11/1989 |
| GB | 2 253 891 A | 9/1992 |
| GB | 2 286 869 A | 8/1995 |
| JP | 58099539 A  * | 6/1983 |

* cited by examiner

*Primary Examiner* — Thomas J Williams
(74) *Attorney, Agent, or Firm* — Hayes Soloway P.C.

(57) ABSTRACT

A rotary damper comprises a casing fixable to a structure and which comprises a wall which surrounds a chamber filled with a viscous fluid and has an inner surface facing the chamber. A cover is mounted and welded on a shoulder surface of the wall of the casing in such a way as to close the chamber in a sealed manner. A rotor which is mounted rotatably on the casing and comprises a disc portion, adapted to rotate within the chamber, and has a shaft portion extending axially from the disc portion and emerging through the cover so as to be operationally associable with a movable member. The cover has peripherally a collar-like protuberance, extending along the entire perimeter of the cover and coupled to the inner surface of the wall of the casing in such a way as to oppose the infiltration of the viscous fluid between the collar-like protuberance and the inner surface of the wall.

15 Claims, 7 Drawing Sheets

DEVICE FOR BRAKING THE MOVEMENT OF A DOOR, DRAWER OR SIMILAR MOVABLE MEMBER

CROSS REFERENCE TO RELATED APPLICATIONS

This application is a National Stage of International Application No. PCT/IB2007/050670 filed Mar. 1, 2007 claiming priority based on Italian Patent Application No. TO2006U000031 filed Mar. 3, 2006, the contents of all of which are incorporated herein by reference in their entirety.

FIELD OF THE INVENTION

The present invention relates to a device for braking the moment of a door, drawer, or similar member movable with respect to a fixed structure and urged by unidirectional thrust means.

BACKGROUND OF THE INVENTION

Devices of this type are normally used for softening the movement, brought about by spring means, of sliding drawers, such as some types of ash-tray in the dashboard of automotive vehicles, or of hinged doors, of the type used for example in cassette recorders. To this end, such devices comprise a rotor partially received within a chamber of a casing filled with a viscous fluid. The chamber is closed in a sealed manner by a cover, through which emerges a shaft of the rotor. In the majority of the devices on the market, the cover is fixed by welding to a shoulder surface of the casing.

During the mounting of the components on the casing, compression of the viscous fluid occurs, which fluid tends to emerge through the interstice between the cover and the wall of the casing which encloses the rotation chamber. If the viscous fluid succeeds in soiling the shoulder surface onto which the cover is to be welded, this fact may have a negative influence on the quality of the weld, and therefore the seal of the cover. For this reason, the amount of viscous liquid is generally limited compared with that which could theoretically be contained within the chamber. This, however, results in the presence, within the assembled and welded device, of air sacs which may adversely affect the performance of the device.

SUMMARY OF THE INVENTION

It is an aim of the present invention to provide a braking device capable of preventing the aforesaid drawbacks.

The subject of the invention is therefore a device for braking the movement of a door, drawer, or similar movable member.

In such a device, the cover has a collar-like protuberance capable of preventing the infiltration of the viscous fluid as far as the shoulder surface during the mounting and welding of said cover on the casing. It is therefore no longer necessary to limit excessively the amount of viscous fluid contained in the rotation chamber.

BRIEF DESCRIPTION OF THE DRAWINGS

Preferred but non-limiting embodiments of the invention will now be described with reference to the appended drawings, in which.

DETAILED DESCRIPTION OF THE INVENTION

Figure 1:
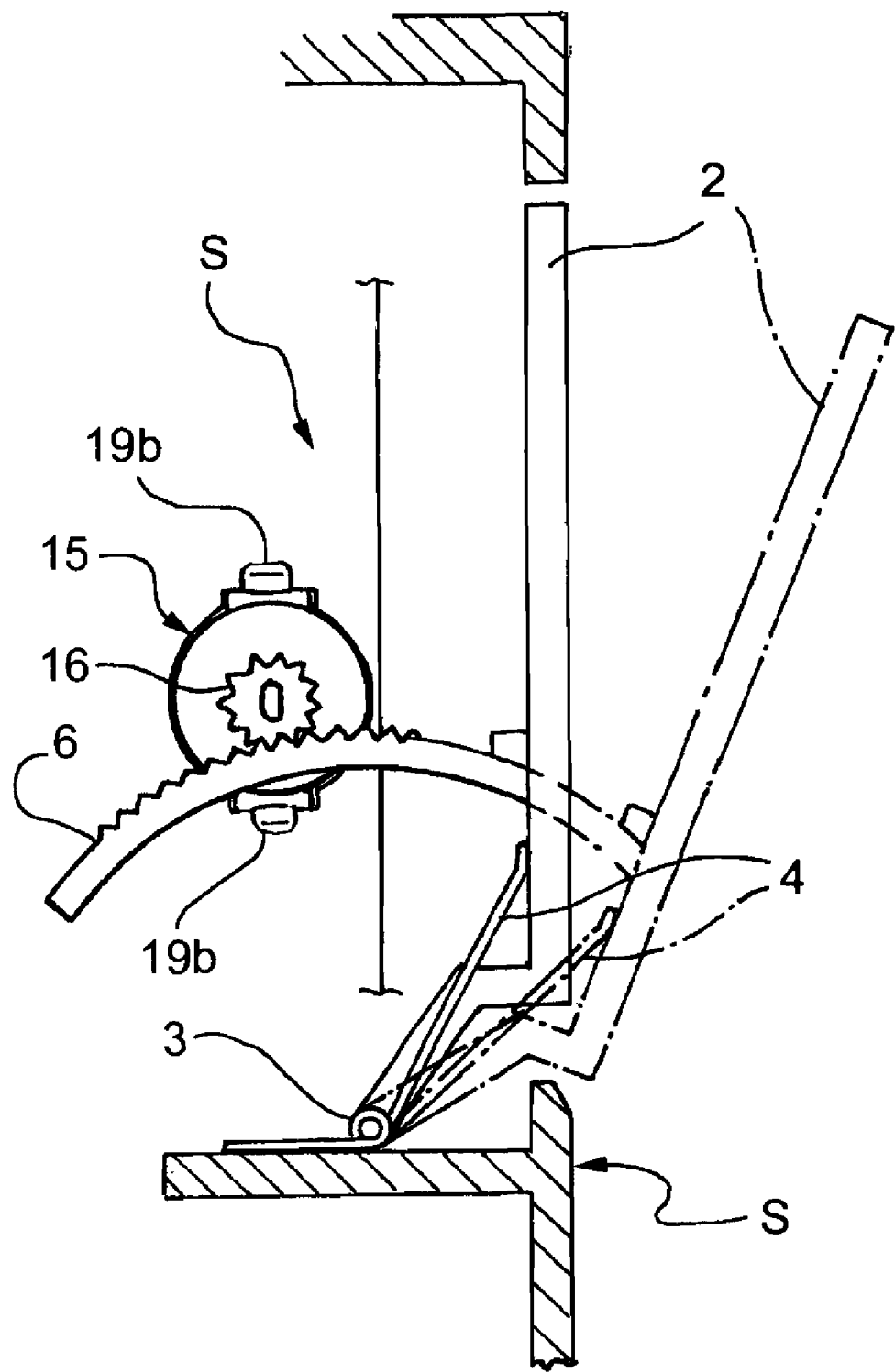
FIG. 1 is a view in longitudinal section of the structure of a door of a cassette recorder incorporating a braking device.
Figure 2:
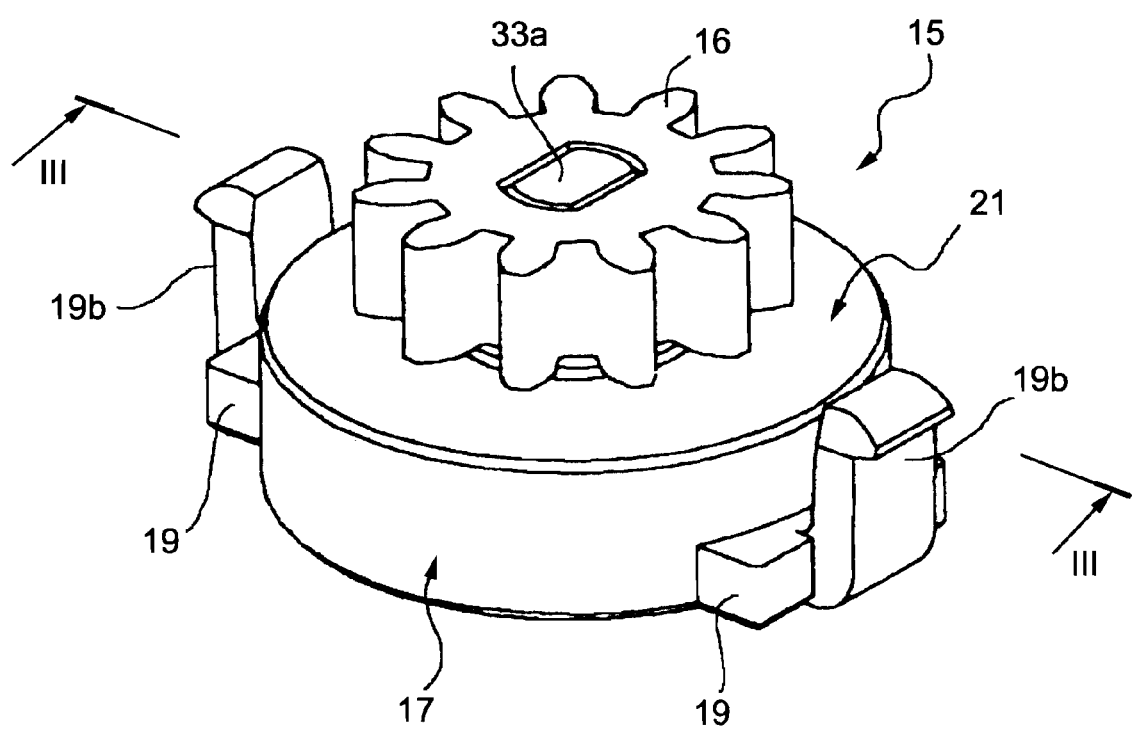
FIG. 2 is a perspective view of a braking device according to the invention.

With reference to FIG. 1, the reference number 2 designates a door, for example the door of a cassette recorder, pivoting about a hinge 3 fixed to the structure S of said recorder, and 4 indicates a spring which urges the door towards its open position. A coupling mechanism (not shown) is also provided, capable of releasably locking the door 2 in its closed position. A curved rack 6 having the centre of curvature coinciding with the hinge axis of the door 2 is rigidly connected to the door. To the structure S of the recorder there is also fixed a braking device 15, commonly termed a rotary damper, provided with a rotatable gearwheel 16 and arranged in such a way as to engage the teeth of the rack 6. The components of said braking device 15, described in more detail hereinafter, are produced from plastics material. By way of example, a device of this type has an overall diameter typically of around 2 cm, and an overall thickness of less than 1 cm.

As an alternative, the device according to the invention may be coupled to a straight rack, to control the movement of a sliding drawer, or used, without a gearwheel, for directly coupling two parts like a hinge. In each case, the type of mechanism to which the braking device is coupled is not essential to the purposes of the invention.

Referring to FIGS. 2 to 5, the device 15 substantially comprises a casing 17 with a wall 17a, which encloses inside it a substantially cylindrical chamber 18 open at one end and bounded laterally by the inner surface 18a of the wall 17a. The device 15 is provided with a pair of lateral tabs 19 equipped with fixing means 19b. In the embodiment illustrated, the fixing means 19b are represented by resilient tongue portions extending upwards. These portions 19b serve for rapid engagement coupling with one of the two bodies between which is it necessary to slow down the relative movement, for example with the structure S of the recorder. Such portions 19b may of course be of a different shape, for example may be folded downwards, or the lateral tabs 19 may be equipped with fixing holes adapted to receive screws, rivets and the like in order to associate the tabs 19 rigidly with the structure S, with the wheel 16 engaged with the rack 6.

Figure 5:
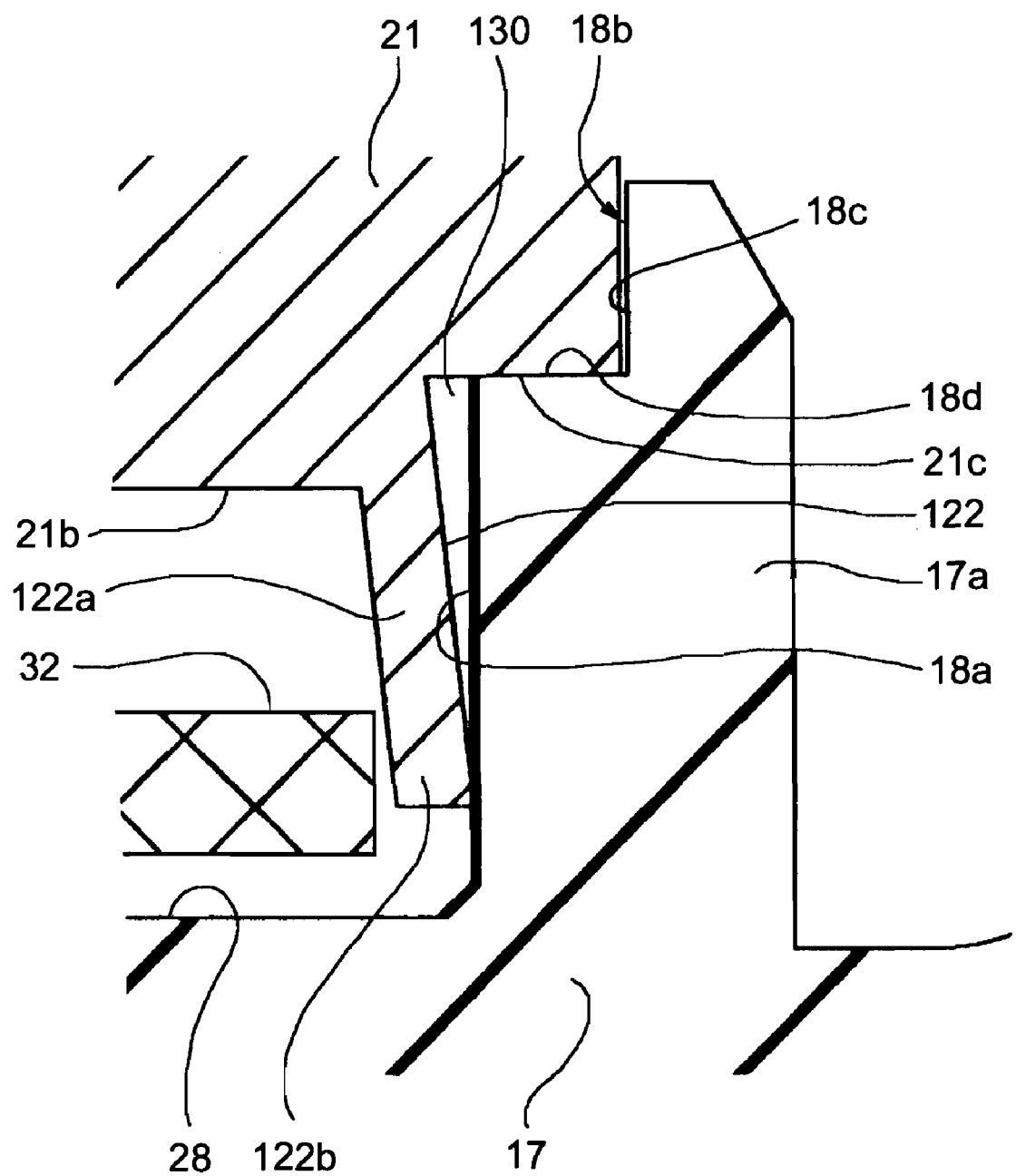
FIG. 5 is an enlarged view of a detail of the device of FIG. 4, indicated by the arrow V in that figure.

With reference in particular to FIG. 5, at the open end of the cylindrical chamber 18 the wall 17a of the casing 17 defines a mouth 18b, around which the wall 17a has a radial profile configured in a step shape. The wall 17a therefore has a lateral surface 18c, substantially parallel to the inner surface 18a of the wall 17a, and a shoulder surface 18d which connects the inner surface 18a of the wall 17a to the lateral surface 18c. The lateral surface 18c and the shoulder surface 18d of the wall 17a bound the mouth 18b circumferentially.

The mouth 18b of the cylindrical chamber 18 is adapted to be closed by a cover 21, which is fixed by means of welding to the casing 17 in such a way as to provide a hermetic seal. Preferably, the weld is an ultrasonic weld, but it may be any type of weld suitable for welding pieces of plastics material to one another, such as, for example, rotational friction welding.

The cover 21 is substantially disc-shaped, and has on opposite sides an axially outer surface 21a and an axially inner surface 21b. In the assembled state of the device 15, the axially inner surface 21b faces on the chamber 18, and the axially outer surface 21a faces towards the outside.

Around the axially inner surface 21b, the cover 21 further has a peripheral surface 21c, intended to bear on the shoulder surface 18d of the wall 17a of the casing 17 when the cover 21 is mounted on the casing. The lateral surface 18c of the wall 17a, on the other hand, provides a centring surface for the cover 21. The welding process which fixes the cover 21 to the casing 17 therefore involves the welding of the peripheral surface 21c of the cover 21 to the shoulder surface 18d of the wall 17a of the casing 17.

The cover 21 has a central through-hole 27. On the bottom 28 of the cylindrical chamber 18, corresponding to the base of the casing 17, a pin portion 29 is formed, which protrudes axially from the centre of the bottom 28 of the chamber 18 towards the inside of the chamber.

The device 15 further comprises a rotor 31 partially received inside the chamber 18. The rotor 31 comprises a disc portion 32, adapted to rotate within the casing 17, and a shaft portion 33, which extends axially from the centre of the disc portion 32 and emerges from the cover 21 of the casing 17, passing through the central hole 27. The free end 33a of the shaft portion 33 of the rotor 31 is arranged in such a way as to allow the mounting of the gearwheel 16. The rotor 31 further has a central hole 34 provided in the bottom of the disc portion 32, which allows the mounting of the rotor 31 on the pin portion 29 of the casing 17 so as to provide an axis of rotation x for the rotor.

The chamber 18 contains a highly viscous fluid of known type, for example silicone oil, such that the disc portion 32 of the rotor 31 is slowed down in its rotational movement by friction with the viscous fluid. The disc portion 32 is of conventional type, and may for example be in the shape of a complete disc with through-holes, or may be provided with blades. Its shape is not however essential to the purposes of the invention.

The hermetic seal through the central hole 27 is assured by an O-ring 41 received in a circular seat 42 provided in the cover 21 around the central hole 27.

According to the invention, the cover 21 has peripherally a collar-like protuberance 122, extending along the entire perimeter of the cover 21. The collar-like protuberance 122 projects from the axially inner surface 21b of the cover 21 in such a way as to be inserted inside the chamber 18. The collar-like protuberance 122 is interposed between the axially inner surface 21b and the peripheral surface 21c of the cover 21.

The collar-like protuberance 122 defines a wall 122a which extends along the entire perimeter of the chamber 18. The collar-like protuberance 122 is coupled to the inner surface 18a of the wall 17a of the cover 17 in such a way as to oppose the infiltration of the viscous fluid between the collar-like protuberance 122 and the inner surface 18a of the wall 17a of the casing 17. In other words, it is configured in such a way as to provide an interference coupling, a sliding coupling or a coupling with a slight clearance with the inner surface 18a of the wall 17a of the casing 17. In the case of coupling with a slight clearance, the clearance must be so slight as to prevent, or at least slow down sufficiently, the infiltration of the viscous fluid during the assembly and welding of the device 15.

Preferably, as is clearer from FIG. 5, the wall 122a of the collar-like protuberance 122 has a radial profile which extends in a straight line from the axially inner surface 21b of the cover 21. In an alternative embodiment (not illustrated), the wall 122a may have a profile which extends in a curve from the axially inner surface 21b, for example such as to be convex, with the concavity facing towards the axis of rotation x.

Preferably, as is clear from FIG. 5, the radial profile of the wall 122a of the collar-like protuberance 122 is inclined with respect to the direction perpendicular to the axially inner surface 21b of the cover 21, that is, with respect to the axis of rotation x. In particular, the radial profile of the wall 122a is inclined towards the cylindrical surface 18a of the chamber 18. The collar-like protuberance 122 therefore has a substantially flared shape overall. In this way, between the wall 122a of the collar-like protuberance 122 and the surface 18a of the wall 17a of the casing 17 a gap 130 is defined, which has a maximum radial width at the base of the collar-like protuberance 122, that is, at the peripheral surface 21c of the cover 21, and a minimum width at the free end 122b of the collar-like protuberance 122. In this embodiment, the free end 122b is the part of the collar-like protuberance 122 which is coupled to the inner surface 18a of the wall 17a of the casing 17, so as to oppose the infiltration of the viscous fluid between the collar-like protuberance 122 and the inner surface 18a of the wall 17a.

Preferably, the radial profile of the wall 122a extends axially in such a way that, in the state in which the cover 21 is welded to the casing 17 (illustrated in FIG. 3), it is radially interposed between the edge of the disc portion 32 and the inner surface 18a of the wall 17a of the casing 17. Still more preferably, the radial profile of the wall 122a extends axially in such a way that, in the state in which the cover 21 is welded to the casing 17 (illustrated in FIG. 3), the end 122b of the wall 122a is arranged in proximity to the bottom 28 of the chamber 18.

Figure 3:
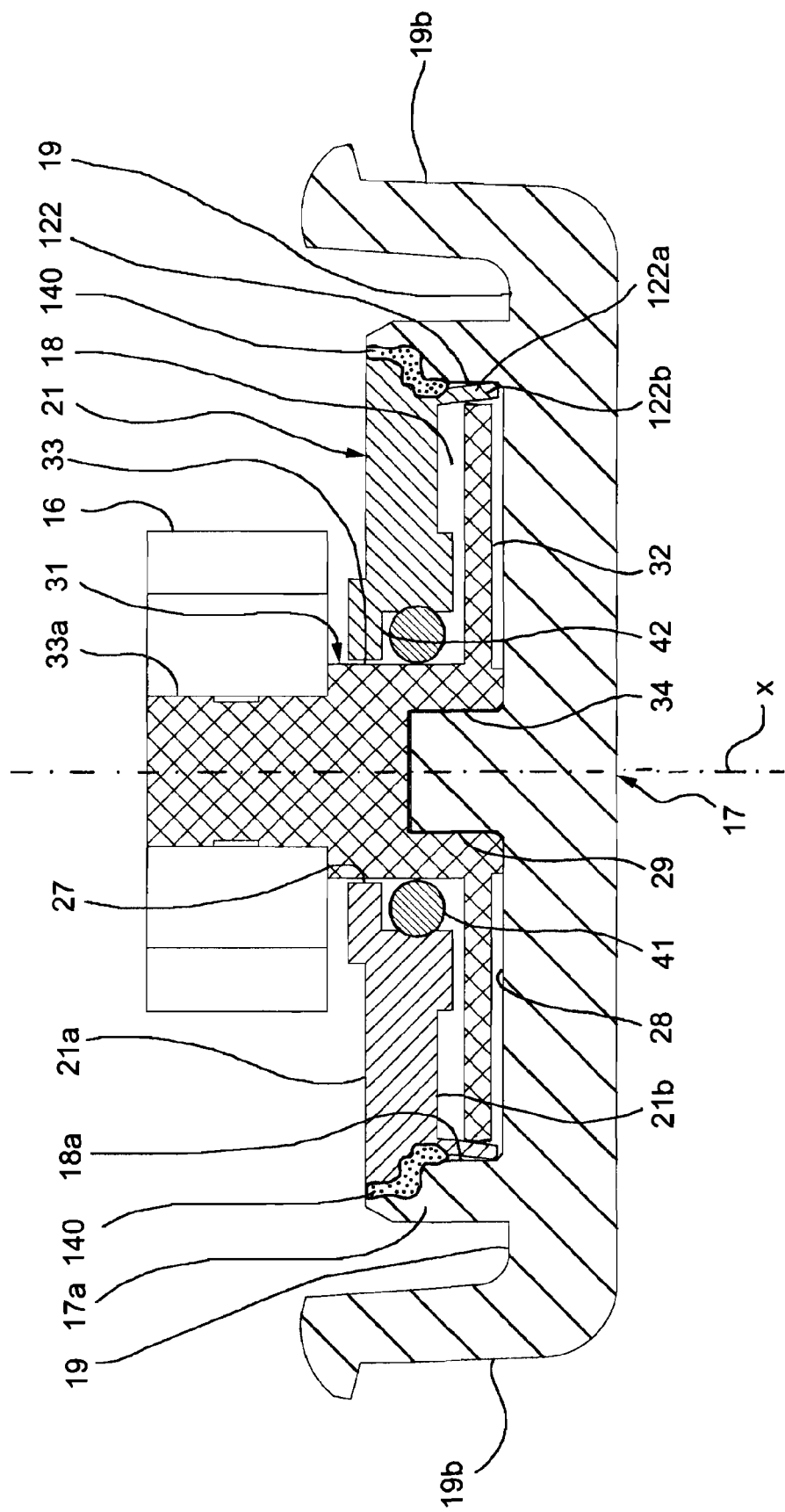
FIG. 3 is a sectional view of the device of FIG. 2.
Figure 4:
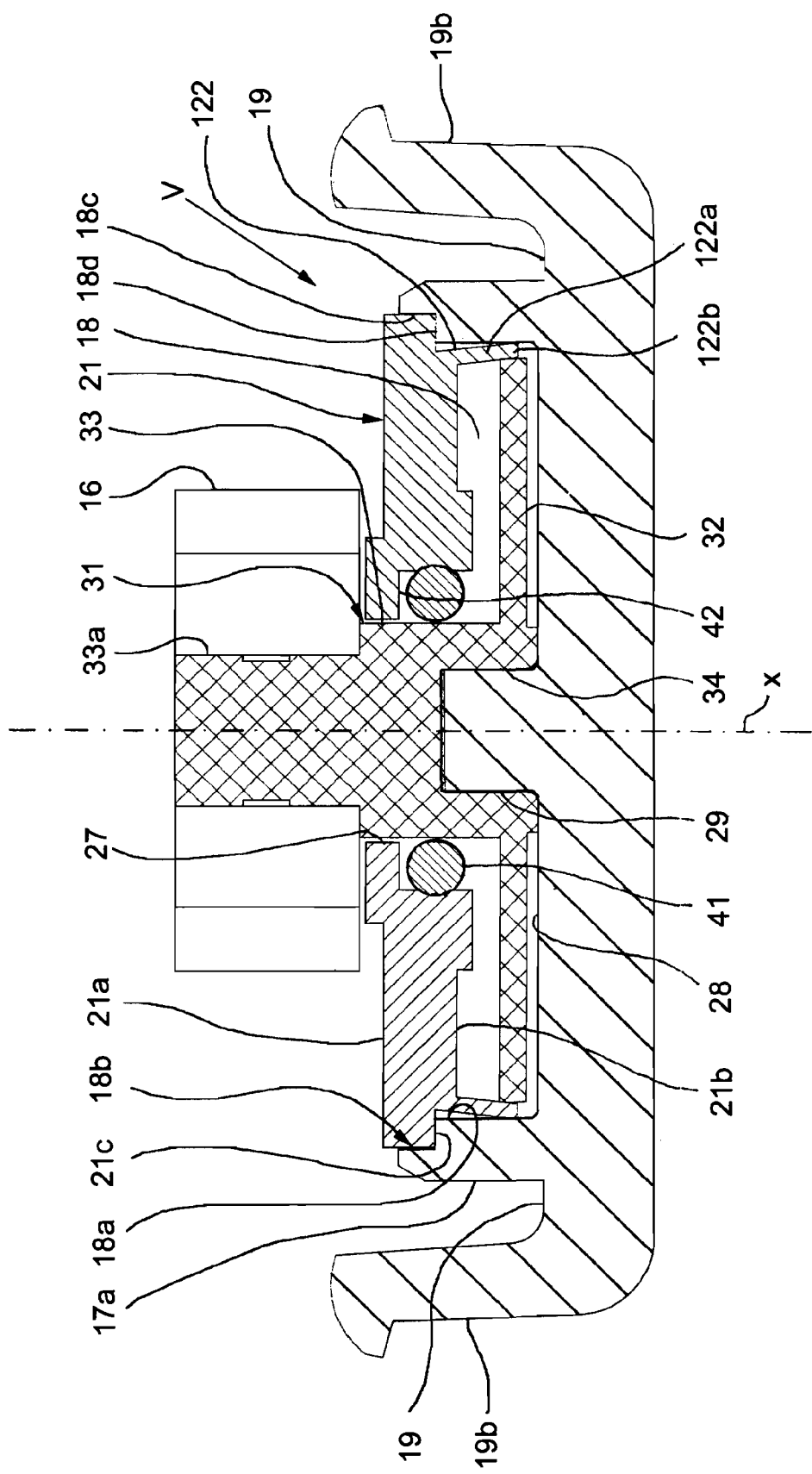
FIG. 4 is a view analogous to FIG. 3, in which the device is illustrated before a welding operation.
Figure 6:
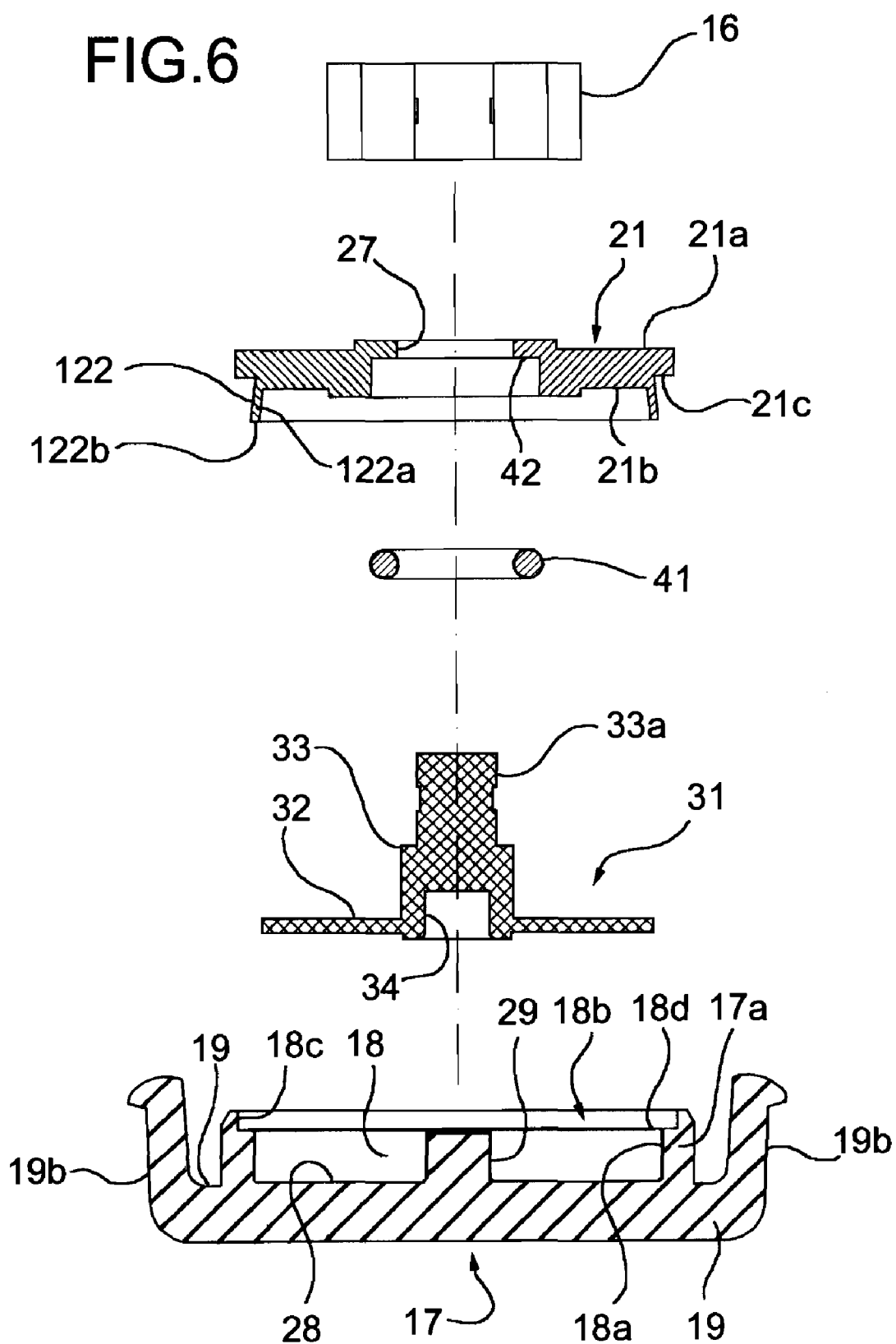
FIG. 6 is an exploded sectional view of the device of FIG. 4.

With reference to FIGS. 3, 4 and 6, a process of assembly and welding of a braking device according to the invention will now be illustrated. On the casing 17, into the chamber 18 of which a specific quantity of viscous fluid has previously been poured, the rotor 31, the O-ring 41, the cover 21 and the gearwheel 16 are mounted, obtaining the arrangement illustrated in FIG. 4. As a result of the mounting of those parts, the viscous fluid is compressed inside the chamber 18, and tends to flow towards the escape routes constituted by the central hole 27 of the cover 21 and the interstice between the cover 21 and the lateral surface 18c of the mouth 18b. This tendency may be aggravated by the subsequent welding of the cover 21 to the casing 17, since that process causes a lowering of the cover 21 inside the chamber 18. The passage of the viscous fluid through the central hole 27 of the cover 21 is however impeded by the O-ring 41, while the passage of the viscous fluid through the interstice between the cover 21 and the lateral surface 18c of the mouth 18b is impeded upstream by the coupling between the collar-like protuberance 122 and the inner surface 18a of the wall 17a of the casing 17.

In this way, the shoulder surface 18d of the wall 17a of the casing 17 and the peripheral surface 21c of the cover 21 are not soiled by the viscous fluid. The welding of the cover 21 to the casing 17 can then take place uniformly along the entire peripheral surface 21c of the cover 21. The molten material produced by the welding process, indicated by 140 in FIG. 3, passes in part through the interstice between the cover 21 and the lateral surface 18c of the mouth 18b, and in part is discharged advantageously inside the gap 130.

As emphasized above, the lowering of the cover 21 causes further compression of the viscous fluid within the chamber 18. Any excess air still present in the chamber 18 is discharged through the central hole 27. In this way the presence of air sacs or bubbles within the chamber 18, which could have a negative influence on the performance of the device 15, is eliminated or at least reduced.

Figure 7:
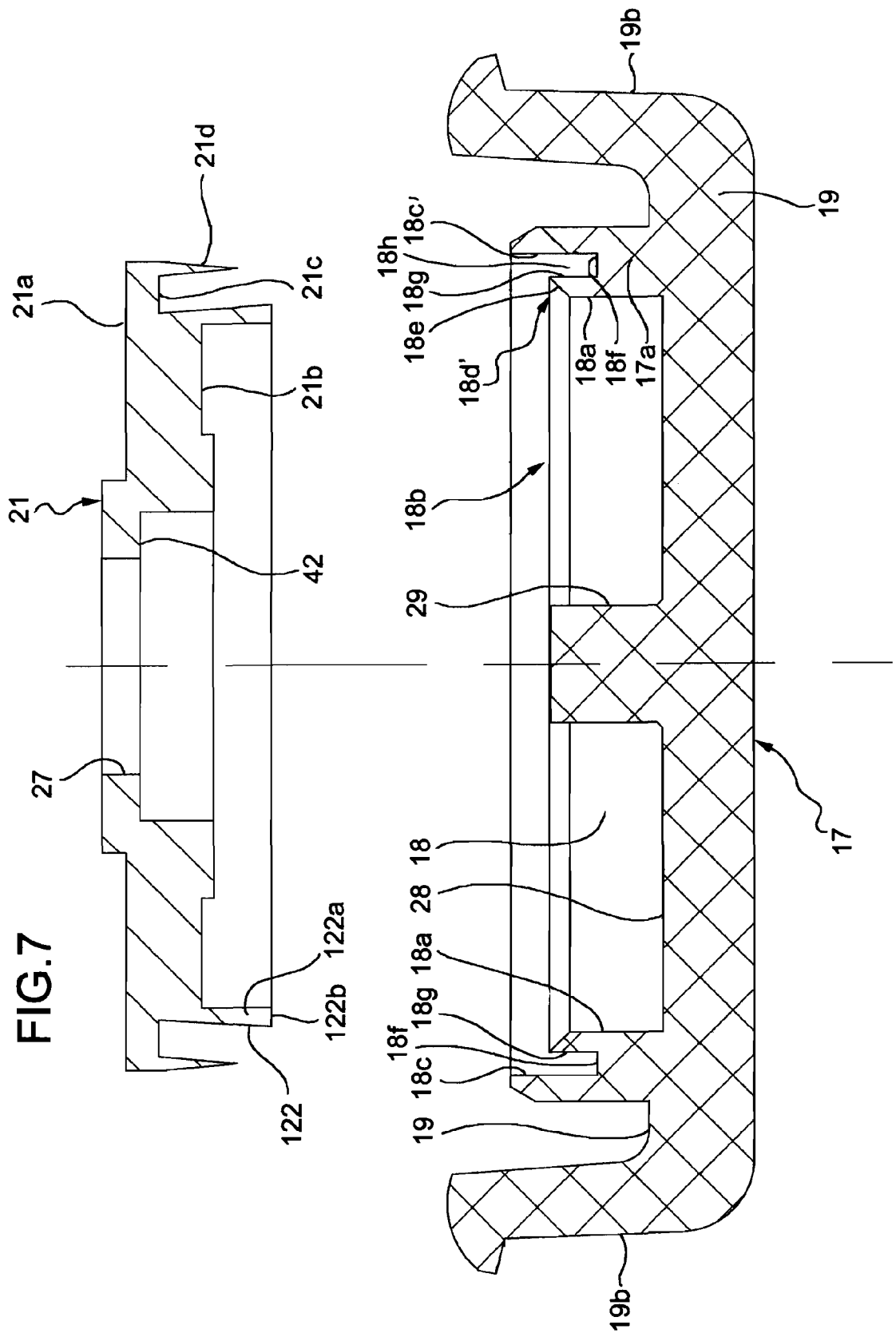
FIG. 7 is an exploded sectional view of a casing and of a cover of an advantageous embodiment of the device according to the invention.

With reference to FIG. 7, a particularly advantageous embodiment of the device according to the invention will now be described. This embodiment is substantially identical to the embodiment described previously, and differs therefrom solely in the different configuration of the parts of the casing 17 and of the cover 21 which are intended to be welded to one another. Consequently, for the sake of simplicity, FIG. 7 shows only the casing 17 and the cover 21, and the elements corresponding to those of the embodiment described previously have been indicated by the same reference numbers. At the open end of the cylindrical chamber 18, the wall 17a of the casing 17 defines a mouth 18b, around which the wall 17a has a radial profile configured in a fork shape. The wall 17a therefore has a lateral surface 18c, substantially parallel to the inner surface 18a of the wall 17a, and a shoulder surface 18d' which extends from the inner surface 18a of the wall 17a in a radially outward direction, connecting it to the lateral surface 18c of the wall 17a. The shoulder surface 18d' comprises a radially inner portion 18e of flared shape, a radially outer portion 18f arranged at a lower level than the radially inner portion 18e, and an intermediate portion 18g which connects to one another the portions 18e and 18f of the shoulder surface 18d', and which extends substantially parallel to the lateral surface 18c. The radially outer portion 18f of the shoulder surface 18d' is in turn connected to the lateral surface 18c. A circumferential groove 18h is therefore provided in the wall 17a of the casing 17 adjacent to the lateral surface 18c, which is bounded, apart from by the lateral surface 18c, by the radially outer and intermediate portions 18f, 18g of the shoulder surface 18d', which therefore define, respectively, a bottom surface and an inner lateral surface of the groove 18h. The lateral surface 18c and the shoulder surface 18d' of the wall 17a bound the mouth 18b circumferentially.

The cover 21 is adapted to close the mouth 18b of the cylindrical chamber 18, and is fixed by means of welding to the casing 17 in such a way as to provide a hermetic seal.

To this end, the cover 21 has a peripheral surface 21c and an elongated energy director 21d, the second at least of which is intended to bear on part of the shoulder surface 18d' of the wall 17a of the casing 17 when the cover 21 is mounted and welded on the casing. The lateral surface 18c of the wall 17a, on the other hand, provides a centring surface for the cover 21. For the welding of the cover 21 to the casing 17, the elongated energy director 21d is provided, which extends in an axial direction from the peripheral surface 21c along the perimeter of the cover 21, and has a triangular cross-section. By the term elongated it is to be understood that the energy director 21d has a greater length than the energy director normally used for welding between a casing and a cover which have a configuration of surfaces to be welded such as that described in the previous embodiment. By way of example, the conventional director for the welding of the cover to a flat surface without grooves generally has a length of from 0.15 to 0.5 mm, with inclination of the lateral surfaces of from 20° to 45° with respect to the vertical, while the elongated energy director has a length of from 0.6 mm to 2 mm, with inclination of the lateral surfaces of from 5° to 15°. The groove 18h of the wall 17a of the casing 17 has a depth which is less than the height of the director, and a width substantially equal to the thickness of the director at its base. The energy director 21d is arranged in such a way that it can be inserted, during assembly, in the groove 18h of the wall 17a of the casing 17, bearing with its head portion on the bottom surface 18f of the groove 18h. The welding process which fixes the cover 21 to the casing 17 therefore comprises the fusion of at least part of the energy director 21d inside the groove 18h, and therefore the welding of the peripheral surface 21c of the cover 21 to the surfaces 18c, 18f and 18g of the groove 18h. The fusion of the energy director 21d involves a lowering of the cover 21 on the casing 17, which is however limited in a predetermined manner by the radially inner portion 18e of the shoulder surface 18d'.

Besides solving the problems linked to welding in the manner already indicated with reference to the preceding embodiment, the embodiment with the elongated energy director and the corresponding groove has further advantages.

The energy director of elongated shape in fact makes it possible to obtain modularity of the weld, since it makes it possible to decide on the basis of some technical factors the weld height of the cover. Moreover, the groove constitutes a seat for the energy director capable of containing, at least partially, the welding flash material, limiting or actually eliminating the amount of molten material which passes through the interstice between the cover 21 and the lateral surface 18c of the mouth 18b or into the air gap 130 (visible in FIG. 5) between the wall 122a of the collar-like protuberance 122 of the cover 21 and the surface 18a of the wall 17a of the casing 17.

Moreover, the length of the directing means makes it possible to compensate for any partial welds which might be caused by insufficient flatness of the items, ensuring a sufficient quantity of molten material along the entire perimeter of the weld line.

Finally, the energy-directing means and the groove also have the function of mechanical guide during the coupling of the components, securing the casing and the cover for the purpose of greater concentricity.

It is to be understood that the invention is not limited to the embodiments described and illustrated herein, but is capable of modifications relating to shape and arrangement of parts, details of construction and function, depending on the numerous possible variants which will be deemed suitable by experts in the field, and which are to be understood as coming within the scope of the invention, as defined by the following claims.

The invention claimed is:

1. A device for braking the movement of a door, drawer, or similar member movable with respect to a fixed structure and urged by unidirectional thrust means, comprising:
   a casing fixable to one of said movable member and structure, said casing comprising a wall which surrounds a chamber filled with a viscous braking fluid and has an inner surface facing the chamber,
   a cover mounted and welded on a shoulder surface of the wall of the casing so as to close said chamber in a sealed manner, and
   a rotor mounted rotatably on the casing, said rotor comprising a disc portion, adapted to rotate within the chamber, and a shaft portion extending axially from the disc portion and emerging through the cover so as to be operationally associable with the other of said movable member and structure,
   wherein the cover has peripherally a collar protuberance, extending along the entire perimeter of the cover and coupled to the an inner surface of the wall of the casing in such a way as to oppose the infiltration of the viscous fluid between said collar protuberance and the inner surface of the wall of the casing, and
   wherein between the collar protuberance and the inner surface of the wall of the casing a gap is defined, which has a maximum radial width in proximity to the cover, and a minimum width at a portion of the collar protuberance coupled to the inner surface of the wall of the casing.

2. A device according to claim 1, wherein said collar protuberance has a radial profile which extends in a straight line from the cover.

3. A device according to claim 2, wherein said collar protuberance has a radial profile inclined with respect to the axis of rotation of the rotor.

4. A device according to claim 3, wherein the inclined radial profile of the collar protuberance is inclined towards the inner surface of the wall of the casing, such that the collar protuberance has a substantially flared shape overall.

5. A device according to claim 1, wherein said collar protuberance has a radial profile which extends in a curve from the cover.

6. A device according to claim 5, wherein the collar protuberance is convex, with the concavity facing towards the axis of rotation of the rotor.

7. A device according to claim 1 wherein said portion of the collar protuberance coupled to the inner surface of the wall of the casing is an end portion of the collar protuberance.

8. A device according to claim 1, wherein said collar protuberance extends axially from the cover to such an extent as to be radially interposed between the disc portion of the rotor and the inner surface of the wall of the casing.

9. A device according to claim 8, wherein said collar protuberance extends axially from the cover to such an extent that an end portion of the collar protuberance is arranged in proximity to the bottom of the chamber.

10. A device according to claim 1, wherein the cover is welded on a mouth of the casing, around which the wall of the casing has a radial profile configured in a step shape.

11. A device according to claim 10, wherein around the mouth of the wall of the casing has a lateral surface, substantially parallel to the inner surface of the wall of the casing, a shoulder surface connecting the inner surface of the wall to the lateral surface of the wall.

12. A device according to claim 1, wherein the cover is welded on a mouth of the casing, around which the wall of the casing has a radial profile configured in a fork shape, the wall of the casing having a circumferential groove inside which is welded to an elongated energy director, which extends circumferentially and in an axial direction from a peripheral surface of the cover.

13. A device according to claim 12, wherein around the mouth the wall of the casing has a lateral surface, substantially parallel to the inner surface of the wall of the casing, a shoulder surface connecting the inner surface of the wall to the lateral surface of the wall, and wherein the circumferential groove is provided on the shoulder surface.

14. A device according to claim 13, wherein the shoulder surface comprises a radially inner portion of flared shape, a radially outer portion arranged at a lower level than the radially inner portion, and an intermediate portion which connects to one another the portions of the shoulder surface, and which extends substantially parallel to the lateral surface.

15. A device according to claim 1, wherein the cover is welded to the casing by ultrasonic welding.

* * * * *